(12) United States Patent
Durrani et al.

(10) Patent No.: US 10,875,385 B2
(45) Date of Patent: Dec. 29, 2020

(54) CLIMATE CONTROL SYSTEM OF A MOTOR VEHICLE AND METHOD FOR OPERATING THE CLIMATE CONTROL SYSTEM

(71) Applicant: Hanon Systems, Daejeon (KR)

(72) Inventors: Navid Durrani, Kerpen (DE); Martin Hötzel, Ratingen (DE); Tobias Haas, Cologne (DE); Gerald Richter, Aachen (DE); Marc Graaf, Krefeld (DE)

(73) Assignee: Hanon Systems, Daejeon (KR)

(*) Notice: Subject to any disclaimer, the term of this patent is extended or adjusted under 35 U.S.C. 154(b) by 56 days.

(21) Appl. No.: 16/274,960

(22) Filed: Feb. 13, 2019

(65) Prior Publication Data
US 2019/0263223 A1    Aug. 29, 2019

(30) Foreign Application Priority Data
Feb. 27, 2018   (DE) .................. 10 2018 104 410

(51) Int. Cl.
*B60H 1/00* (2006.01)
(52) U.S. Cl.
CPC ..... *B60H 1/00921* (2013.01); *B60H 1/00278* (2013.01); *B60H 2001/00307* (2013.01);
(Continued)
(58) Field of Classification Search
CPC ............ B60H 1/00921; B60H 1/32284; B60H 1/00278; B60H 1/00592;
(Continued)

(56) References Cited

U.S. PATENT DOCUMENTS

2009/0317697 A1    12/2009  Dogariu et al.
2012/0252340 A1*   10/2012  Gannon ............. B60H 1/00028
                                                                    454/75
(Continued)

FOREIGN PATENT DOCUMENTS

DE    102011016070 A1    10/2012
DE    102012108891 A1     3/2014
(Continued)

*Primary Examiner* — Joseph F Trpisovsky
(74) *Attorney, Agent, or Firm* — Norton Rose Fulbright US LLP; James R. Crawford

(57) ABSTRACT

A climate control system for conditioning air of a motor vehicle passenger compartment and a method for operating same includes a climate control unit with a housing with a first flow channel and a second flow channel for conducting air, a refrigerant circulation and first and second coolant circulation. Refrigerant circulation is implemented with refrigerant-air heat exchanger operable as evaporator independently of operating mode Refrigerant-air heat exchanger is disposed within housing of the climate control unit. First refrigerant-coolant heat exchanger operates as condenser/gas cooler independently of operating mode. Second refrigerant-coolant heat exchanger operates as evaporator independently of the operating mode are disposed outside of housing of climate control unit. First coolant circulation comprises second refrigerant-coolant heat exchanger and heat exchangers for conditioning components of power train and a battery heat exchanger. Second coolant circulation is implemented with first refrigerant-coolant heat exchanger and with heating heat exchanger disposed within the housing of the climate control unit.

15 Claims, 6 Drawing Sheets

(52) U.S. Cl.
CPC .............. *B60H 2001/00928* (2013.01); *B60H 2001/00957* (2013.01)

(58) Field of Classification Search
CPC ........... B60H 2001/00178; B60H 2001/00949; B60H 2001/00942; B60H 2001/00307; B60H 2001/00957; F25B 25/005; F25B 7/00; F25B 6/02; F25B 2400/0409; F25B 2600/2501; F25B 2339/047
See application file for complete search history.

(56) References Cited

U.S. PATENT DOCUMENTS

| | | | |
|---|---|---|---|
| 2017/0021695 A1* | 1/2017 | Durrani | B60H 1/00921 |
| 2017/0021698 A1* | 1/2017 | Hatakeyama | B60H 1/143 |
| 2017/0174038 A1* | 6/2017 | Scheldel | B60H 1/32284 |
| 2018/0086224 A1* | 3/2018 | King | B60H 1/00278 |
| 2020/0139788 A1* | 5/2020 | Dong | B60H 1/32 |

FOREIGN PATENT DOCUMENTS

| | | |
|---|---|---|
| DE | 102012108043 A1 | 5/2014 |
| DE | 102013206630 A1 | 10/2014 |
| DE | 112014005360 T5 | 8/2016 |
| DE | 102016121362 A1 | 5/2018 |
| JP | 2002-005532 A | 1/2002 |
| JP | 2014-037180 A | 2/2014 |
| JP | 2014-513645 | 6/2014 |
| JP | 2015-186989 A | 10/2015 |
| JP | 2015193381 A | 11/2015 |
| JP | 2017-503709 A | 2/2017 |

* cited by examiner

CLIMATE CONTROL SYSTEM OF A MOTOR VEHICLE AND METHOD FOR OPERATING THE CLIMATE CONTROL SYSTEM

This application claims priority from German Patent Application No. 10 2018 104 410.0, filed Feb. 27, 2018. The entire contents of this application is incorporated herein by reference in its entirety.

FIELD OF THE INVENTION

The invention relates to a climate control system for conditioning the air of a motor vehicle passenger compartment developed for operating in chiller mode, in heat pump mode as well as in reheat mode. The climate control system comprises a climate control unit with a housing, a refrigerant circulation with a refrigerant-air heat exchanger and a refrigerant-coolant heat exchanger as well as a first coolant circulation and a second coolant circulation. The invention further relates to a method for operating the climate control system.

BACKGROUND OF THE INVENTION

In motor vehicles of prior art the waste heat of the engine is utilized for heating the inflowing air for the passenger compartment. The waste heat is transported by means of the coolant circulated in the engine coolant circuit to the climate control unit and here transferred via the heating heat exchanger to the air flowing into the passenger comparted. Known installations with coolant-air heat exchangers, which obtain the heating capacity from the coolant circulation of an efficient combustion engine of the motor vehicle drive, do not generate sufficient waste heat to attain, in particular at low ambient temperatures, the level of heating the air of the passenger compartment that is commensurate with the requirements of thermal comfort or to reach the level required for heating the passenger compartment to a pleasant degree and to cover the total heat requirement of the passenger compartment. Similar considerations apply to installations in motor vehicles with hybrid drive, which means motor vehicles with electromotive as well as also IC engine-powered drive.

Furthermore, there is currently the trend toward complete electrification of the drive, such as for example in the case of purely electromotively driven vehicles with batteries or fuel cells. In these cases, the waste heat of the combustion engine is not available as a possible heat source for heating the air.

The energy quantity that is storable in the battery of the motor vehicle is moreover less than the energy quantity that is storable in the form of liquid fuel within the fuel tank. The capacity required for the control of the passenger compartment climate of an electrically drive motor vehicle has additionally a significant influence on the range of the motor vehicle.

When the total heat requirement of the passenger compartment cannot be met by means of the heat from the engine coolant circulation, auxiliary heating measures are required such as electrical resistance heating elements, termed PTC resistance for "Positive Temperature Coefficient Thermistor, or fuel heaters.

A more efficient feasibility for heating the air for the passenger compartment is represented by a climate control system with a refrigerant circulation with heat pump function, also termed heat pump, with air as the heat source, in which the refrigerant circulation serves as the sole heating means as well as also as auxiliary heating measure. The refrigerant circulation in this case demands considerably more installation space than a refrigerant circulation intended purely for cooling the air in combination with an electrical resistance heater.

A climate control system with downstream electrical resistance heater is, for one, more cost-effective of production and can be installed in any motor vehicle. However, it does have very high electrical energy requirements since the inflowing air for the passenger compartment in its flow across an evaporator of the refrigerant circulation is first cooled and/or dehumidified and subsequently heated by means of the electrical resistance heater which transfers the heat directly to the inflowing air or to a coolant circulation.

While operating a conventional refrigerant circulation as a heat pump is efficient, it does however require very large installation space and that at locations within the motor vehicle that do not offer any installation space provisions for controlling the climate.

Inherent in all climate control systems of motor vehicles with a refrigerant circulation to be operated as heat pump is that in the operation in chiller mode the heat required for the evaporation of the refrigerant is drawn from the inflowing air for the passenger compartment or from a coolant circulation, for example for tempering electrical components, such as the traction battery, of the power train. In a heat exchanger operated as condenser/gas cooler the heat absorbed in the evaporation is released to the surrounding at a higher temperature level. During operation of the refrigerant circulation in heat pump mode the heat required for the evaporation of the refrigerant is absorbed from a waste heat source, such as the ambient air or the coolant circulation, for example, for tempering electrical components of the power train. In a heat exchanger disposed as so-called interior space or passenger compartment condenser/gas cooler, the heat is released to the inflowing air of the passenger compartment at a high temperature level.

Prior art air-air heat pumps, developed for combined chiller mode and heat pump mode, which means for heating mode as well as also reheat mode, also termed reheat operation, that draw the heat from the ambient air, the refrigerant is evaporated by absorbing heat from the ambient air which is transferred in a refrigerant-air heat exchanger either directly to the refrigerant or indirectly in a refrigerant-coolant heat exchanger. Ambient air, consequently, serves as the heat source for the evaporation of the refrigerant. The performance and efficiency of the system depends especially on the air quantity and its level of temperature that is available for the evaporation of the refrigerant.

Apart from the heat exchanger for the heat transfer between refrigerant and ambient air, conventional air-air heat pumps comprise a heat exchanger for the heat supply from the air of the passenger compartment to be conditioned to the refrigerant as well as a heat exchanger for the heat transfer from the refrigerant to the air for the passenger compartment to be conditioned. The energy transfer always takes place between the refrigerant and air.

In so-called reheat mode the air to be supplied to the passenger compartment is cooled, in the process it is dehumidified and subsequently again minimally heated. In this operating mode the requisite reheat capacity is less than the requisite cooling capacity for cooling and dehumidifying the air.

The heat exchanger for the heat transfer between refrigerant and ambient air of the air-air heat pump, also termed ambient air heat exchanger, is disposed outside of the housing of the climate control system, specifically outside of the climate control unit, at the front side of the motor vehicle and obtains its air in particular through the action of the airstream. During operation of the refrigerant circulation in chiller mode, the ambient air heat exchanger is operated as condenser/gas cooler for the heat release from the refrigerant to the ambient air and, during operation of the refrigerant circulation in heat pump mode, it is operated as evaporator for the heat absorption by the refrigerant from the ambient air.

During operation of the refrigerant circulation in heat pump mode and ambient air as the heat source at temperatures of the air in the range of 0° C. and below 0° C., there is the risk of ice formation on the heat transfer surface of the heat exchanger operated as evaporator, which limits the performance of the heat exchanger. As a consequence of absorbing heat from the air, the relative air humidity of the cooled air increases. When the temperature falls below dew point, the water vapor in the air condenses out as water onto the heat transfer surface. The water condensed out of the air on the heat transfer surface solidifies and, at surface temperatures in the range of 0° C. and below 0° C., changes to ice. The growing ice layer decreases the air-side heat transfer area as well as the air-side heat transfer and therewith the transferable energy between air and the evaporating refrigerant, leading to a decrease of the efficiency of the control system overall. The maximal temperature difference between the temperature of the air entering the ambient heat exchanger and the temperature of the refrigerant is generally limited which, in turn, limits the heat that can be maximally drawn from the ambient air.

As a consequence of the necessity of having to avoid development of icing of the heat transfer surface of the ambient air heat exchanger, it is not possible at air temperatures in the range of 0° C. and below, even in climate control systems operated as air-air heat pumps, to heat the passenger compartment adequately if ambient air is exclusively used as the heat source such that auxiliary heating means are required. Electrical resistance heaters that could be considered are not energy efficient and are, moreover, rarely operated as auxiliary heaters.

Conventional refrigerant side-controlled climate control systems are, furthermore, highly complex especially with respect to the refrigerant lines in connection with valves and most frequently include switched-off flow paths as well as changing flow directions in subsections.

Apart from prior art climate control systems for motor vehicles for the combined operation in chiller and heat pump mode for heating, cooling and dehumidifying the air to be conditioned and supplied to the passenger compartment, climate control systems are also known in which the evaporator is operated as evaporator in chiller mode as well as also in heat pump mode and the condenser, also in chiller mode as well as in heat pump mode, is operated as condenser. The control of climate control systems are either refrigerant-circulation-controlled and/or air side-controlled.

DE 10 2012 108 891 A1 discloses a climate control system for conditioning the air of a passenger compartment. The climate control system developed for heating and cooling the passenger compartment as well as for reheat operation comprises a housing with two flow channels for the conduction of air as well as a refrigerant circulation with an evaporator and a condenser. The evaporator is here disposed in the first flow channel and the condenser in the second flow channel. Setting the operating mode only takes place via the control of air guide mechanisms. One of the heat exchanger evaporator or condenser is disposed with a portion of the heat transfer surface in the first as well as also in the second flow channel, wherein the proportion of the heat transfer area required for the particular operating mode is adjustable in terms of air supply by means of the air guide mechanism.

The climate control system with a housing implemented as a separate module and a refrigerant circulation integrated therein is of low weight with short and rigid refrigerant lines, which virtually avoids external leakages. The system is constructed without changeover valves for switching between different operating modes. In heat pump mode for warming the passenger compartment the air drawn from the passenger compartment can be utilized to evaporate the refrigerant.

However, the system is preferably operated with two blowers since the evaporator in the first flow channel as well as also the condenser in the second flow channel, and therewith in two independent modules, is equipped with one blower each. The airstream during driving of the motor vehicle cannot be utilized for incident flow on the condenser, and therewith during operation in chiller mode for heat removal from the refrigerant circulation such that the blower transporting air through the second flow channel is continuously in operation. The blower is also operating during travel of the motor vehicle which, compared to conventional installations, lowers the efficiency of the climate control system in particular during operation in chiller mode.

The air-side-controlled climate control systems when operating in chiller mode can, additionally, often only be operated at very low cooling power and require increased installation space.

SUMMARY OF THE INVENTION

The present invention addresses the problem of providing a climate control system with heating functionality, especially for application in motor vehicles. The system is to be laid out for combined operation in chiller and heat pump mode as well as in reheat mode for heating, cooling and dehumidifying the air to be conditioned for the passenger compartment. The operation is to be enabled even in environments with heat sources of low capacity, such as, for example, in energy-efficient combustion engines or hybrid drives of internal combustion engines and electric engines, or with unavailable heat sources from the drive such as for example in the case of electrically driven motor vehicles and it is herein to fulfill all requirements for a comfortable climate in the passenger compartment. The comfort is intended to be always maintainable independently of the operating mode and the climate control system is to be operable independently of the operating mode. Sufficient cooling performance is to be provided even with air-side control. The refrigerant circulation is to be constructed simply of a minimal number of components. In addition, the climate control system is also to enable tempering of components of the power train and to utilize these components as heat sources.

The problem is resolved through the subject matters with the characteristics of the independent patent claims. Further developments are specified in the dependent patent claims.

The problem is resolved through a climate control system for conditioning the air of a motor vehicle passenger compartment. The climate control system developed for operation in chiller mode, in heat pump mode as well as in reheat mode comprises a climate control unit with a housing with a first flow channel and a second flow channel for conducting air, a refrigerant circulation and a first coolant circulation as well as a second coolant circulation.

In reheat mode the air to be supplied to the passenger compartment is cooled and dehumidified, the dehumidified air is subsequently minimally heated. The requisite reheat power in this operating mode is most frequently lower than the requisite cooling power for cooling and dehumidifying the air.

According to the concept of the invention, the refrigerant circulation is implemented with a refrigerant-air heat exchanger, operable as evaporator independently of the operating mode of the climate control system, which is disposed within the housing of the climate control unit. The refrigerant circulation additionally comprises a first refrigerant-coolant heat exchanger, operable independently of the operating mode of the climate control system as condenser/gas cooler, and a second refrigerant-coolant heat exchanger, operable independently of the operating mode of the climate control system as evaporator, which are disposed outside the housing of the climate control unit.

The first coolant circulation is implemented with the second refrigerant-coolant heat exchanger and heat exchangers for conditioning components of a power train as well as with a heat exchanger for the battery, while the second coolant circulation comprises the first coolant-refrigerant heat exchanger as well as a heating heat exchanger disposed within the housing of the climate control unit.

If, in subcritical operation of the refrigerant circulation, such as for example with the refrigerant R134a or under certain ambient conditions, the refrigerant is liquified with carbon dioxide, the heat exchanger is termed condenser. A portion of the heat transfer takes place at constant temperature. In supercritical operation, or at supercritical heat output in the heat exchanger, the temperature of the refrigerant declines continuously. The heat exchanger in this case is also referred to as gas cooler. Supercritical operation can occur under certain ambient conditions or operating modes of the refrigerant circulation, for example, during operation with the refrigerant carbon dioxide.

The climate control system is, moreover, advantageously implemented with air guide mechanisms for opening and closing sections of the housing, such as the first flow channel and the second flow channel, and with only a single blower for conveying an air mass flow through the housing. The air mass flows through the flow channels are regulated by means of the control of the air guide mechanisms, advantageously implemented as louvers, in combination with the rotational speed of the blower.

According to an advantageous embodiment of the invention, on the first flow channel, in the direction of flow of the air downstream of the refrigerant-air heat exchanger, an air guide mechanism and a first cold air flow path are implemented such that an air mass flow to be conducted through the first flow channel and to be conditioned is dividable into two air mass subflows. A first air mass subflow is herein guidable through the first cold air flow path into the surrounding of the housing and a second air mass subflow is guided through a region of the first flow channel, implemented as a second cold air flow path, in the direction toward the passenger compartment.

The second flow channel is herein preferably implemented as a bypass around the refrigerant-air heat exchanger disposed in the first flow channel. The flow channels comprise at least one air guide mechanism for opening and closing the flow cross sections such that an air mass flow conveyed by a blower can be divided into air mass subflows, with a first air mass subflow to be guided into the first flow channel and a second air mass subflow into the second flow channel.

The first flow channel and the second flow channel of the climate control unit are advantageously implemented such that they open out into a connecting element for the conduction and/or mixing as well as for distribution of air mass subflows.

According to a further development of the invention, the climate control unit is implemented as a two-zone climate control unit. Each zone has herein a flow channel that extends from the connecting element to the air outlets. The heating heat exchanger is advantageously disposed within the flow channels and extends across the flow channels.

A further preferred embodiment of the invention comprises that the refrigerant circulation includes a compressor as well as a first refrigerant path and a second refrigerant path which extend from a branch point up to an opening site. Depending on the operating mode of the climate control system, the refrigerant can herein be divided into mass subflows through the refrigerant paths such that the refrigerant paths can be supplied with refrigerant in parallel. In the direction of flow of the refrigerant the branch point is disposed downstream of the first refrigerant-coolant heat exchanger and the opening site upstream of the compressor.

The first refrigerant path advantageously comprises a first expansion element and the refrigerant-air heat exchanger operable as evaporator independently of operating mode.

The second refrigerant path is implemented with a second expansion element and the second refrigerant-coolant heat exchanger operable as evaporator independently of the operating mode.

A further advantage of the invention comprises that the refrigerant circulation includes an internal heat exchanger that is disposed at the high-pressure side between the first refrigerant-coolant heat exchanger and the branch point of the refrigerant paths as well as on the low-pressure side within the first refrigerant path in the direction of flow of the refrigerant downstream of the refrigerant-air heat exchanger. By internal heat exchanger is to be understood a heat exchanger internal to the circulation which serves for the heat transfer between the refrigerant at high pressure and the refrigerant at low pressure. For example, on the one hand, the liquid refrigerant is cooled further after condensation and, on the other hand, the suction gas is superheated before the compressor.

According to a further development of the invention, the first coolant circulation comprises a primary circuit and a secondary circuit, each of which is implemented with at least one conveyance means as well as a branch point and an opening site. One branch point and one opening site are fluidically coupled with one another across a connecting line.

The primary circuit of the first coolant circulation is advantageously implemented with heat exchangers for conditioning components of the power train as well as with a first coolant-air heat exchanger for the heat transfer between the coolant and ambient air. The branch point and the opening site of the primary circuit are preferably disposed in the direction of flow of the coolant in the stated sequence between the conveyance means and the heat exchangers for conditioning the components of the power train.

The primary circuit of the first coolant circulation advantageously comprises additionally a bypass around the first coolant-air heat exchanger which extends from a branch point to an opening site. The branch point of the bypass is preferably disposed between the heat exchangers for conditioning the components of the power train and the first coolant-air heat exchanger, while the opening site of the bypass is disposed between the first coolant-air heat exchanger and the conveyance means.

According to a further advantageous embodiment of the invention, the secondary circuit of the first coolant circulation is implemented with an auxiliary heating element, the second refrigerant-coolant heat exchanger and the battery heat exchanger. The branch point and the opening site of the secondary circuit are implemented in the direction of flow of the coolant in the stated sequence preferably between the second refrigerant-coolant heat exchanger and the battery heat exchanger.

The secondary circuit of the first coolant circulation advantageously comprises additionally a bypass around the battery heat exchanger, which bypass extends from a branch point to an opening site. The branch point of the bypass is herein preferably disposed between the second refrigerant-coolant heat exchanger, in particular between the opening site of the connection with the primary circuit, and the battery heat exchanger, while the opening site of the bypass is developed between the battery heat exchanger and the conveyance means.

According to a preferred embodiment of the invention, the second coolant circulation comprises a conveyance means as well as a first coolant path with the heating heat exchanger and a second coolant path with a second coolant-air heat exchanger for the transfer of heat between the coolant and ambient air. Each coolant path extends herein from a branch point up to an opening site such that the coolant, depending on the operating mode of the climate control system, can be divided into mass subflows through the coolant paths and the coolant paths can be supplied in parallel with coolant.

The problem is also resolved through a method according to the invention for operating a climate control system for the combined operation in chiller mode and heat pump mode for cooling and heating as well as also for operation in reheat mode for conditioning the air of a passenger compartment of a motor vehicle. The method comprises the following steps:
compression of a refrigerant circulating in a refrigerant circulation to a high pressure level,
transfer of heat from the refrigerant at high-pressure level to a coolant circulating in a second coolant circulation during their flow through a first refrigerant-coolant heat exchanger as well as transfer of heat from the coolant to ambient air during the flow through a second coolant-air heat exchanger and/or to inflowing air for the passenger compartment during the flow through a heating heat exchanger,
expansion of the refrigerant to a low pressure level and conduction of the refrigerant through a refrigerant-air heat exchanger operable as evaporator the for absorption of heat from an air mass flow which is conducted through a first flow channel of a climate control unit, and/or expansion of the refrigerant to a low pressure level and conduction of the refrigerant through a second refrigerant-coolant heat exchanger operable as evaporator for the absorption of heat from a first coolant circulation.

According to a further development of the invention, during operation of the climate control system with active cooling of a battery and/or of components of a power train, a coolant of the first coolant circulation is conveyed through a battery heat exchanger and/or through heat exchangers of components of the power train. Herein heat is transferred from the battery and/or heat from the components of the power train to the coolant, which is transferred in the second refrigerant-coolant heat exchanger to the refrigerant circulating in the refrigerant circulation and/or, during the flow through a first coolant-air heat exchanger, is transferred to ambient air.

According to an advantageous embodiment of the invention, in the operation of the climate control system with active heating of a battery and/or with coolant as the heat source for the refrigerant circulating in the refrigerant circulation, a coolant of the first coolant circulation is conveyed through an auxiliary heating element. Heat is herein transferred to the coolant which is transferred in a battery heat exchanger to the battery and/or in the second refrigerant-coolant heat exchanger to the refrigerant circulating in the refrigerant circulation.

The climate control system according to the invention is applicable in motor vehicles driven exclusively electromotively with batteries or fuel cells, in motor vehicles with hybrid drive, which means motor vehicles with electromotive as well as also IC engine-powered drive and highly efficient IC engine-powered drives.

In summary, the resolution according to the invention comprises the following diverse advantages:
efficient climate control system for cooling or simultaneous dehumidification and heating of the inflowing air for the passenger compartment with the advantages of known prior art systems that include two independent blowers, which is however implemented here with only one blower, also through a high degree of waste heat utilization,
modular climate control system, in particular heat pump system with different heat sources, such as interior space heat recovery, with minimal installation space,
active and passive cooling of the battery and further components of the electric power train,
rapid provision of warm inflowing air at low ambient temperatures,
adequate cooling power with air-side control of the inflowing air in the climate control unit, also by utilization of a coolant-cooled condenser/gas cooler,
significantly more efficient operation than in systems with purely electric heating such that, for example, in a purely electrically driven motor vehicle a range gain results and in a motor vehicle with hybrid drive the emission of carbon monoxide is reduced,
no reversal of flow direction of the refrigerant in areas of the refrigerant circulation required for heat transfer such that the components, in particular heat exchangers, are simpler to dimension and risks of possible oil traps are minimized,
avoidance of icing of the ambient air heat exchanger, for example through specific switching between the operating modes of the climate control system such that loss of heating power for the passenger compartment is also avoided, and
modularly implemented climate control system with high- and low-temperature coolant circulation that can be interconnected in simple manner in order to utilize, for example, the waste heat of an internal combustion engine or of electrical components, also, in particular during operation in heat pump mode, in which the ambient air does not have to be used as a heat source, no risk of icing of an external heat exchanger operated as evaporator.

Further details, characteristics and advantages of embodiments of the invention are evident based on the following description of embodiment examples with reference to the associated drawing. In the drawing depict:

DETAILED DESCRIPTION

Figure 1A:
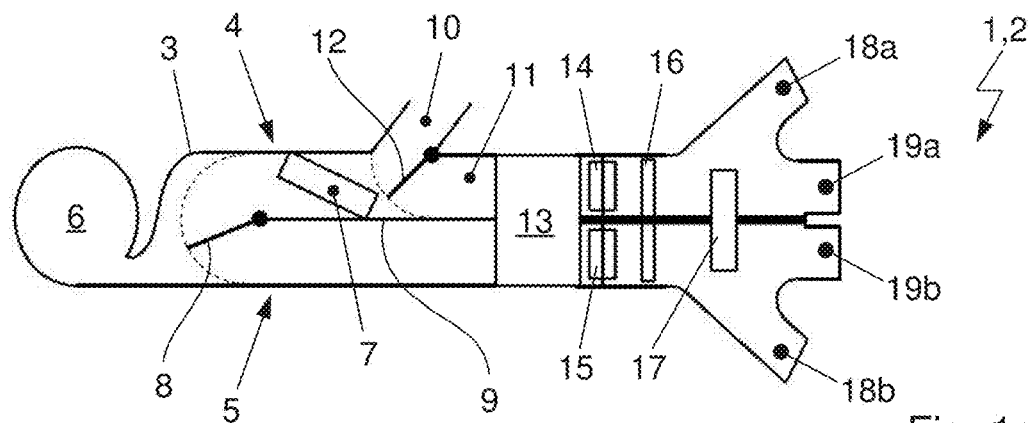
FIG. 1a: a two-zone split climate control unit of a climate control system with an evaporator of a refrigerant circulation and a heating heat exchanger as well as air guide mechanisms, in particular for air-side control.

FIG. 1a shows a climate control unit 2, in particular a two-zone split climate control unit, of a climate control system 1 with an evaporator 7 of a refrigerant circulation and a heating heat exchanger 16 as well as air guide mechanisms 8, 12, 14, 15 for the air-side control of the climate control system 1.

The climate control unit 2 comprises a housing 3 with a first flow channel 4 as well as a second flow channel 5, wherein with a blower 6 an air mass flow can be conveyed through the first flow channel 4 as well as also through the second flow channel 5. The flow channels 4, 5 can be supplied with fresh air from the surrounding, circulating air from the passenger compartment or a mixture of fresh air and circulating air.

Following the blower 6 in the direction of flow of air as well as on inlets into the flow channels 4, 5 an air guide mechanism 8 for dividing and guiding the air into the flow channels 4, 5. The air mass flow conveyed by the blower 6 into the housing 3 can herein be divided in proportions from 0% to 100% onto the flow channels 4, 5. The first flow channel 4 and the second flow channel 5 are separated from one another by a separating wall 9.

Within the first flow channel 4 a refrigerant-air heat exchanger, operable as evaporator 7, of a refrigerant circulation is disposed. When flowing across the heat transfer surface of the refrigerant-air heat exchanger 7 the air is cooled and/or dehumidified. The heat is transferred from the air to the evaporating refrigerant.

In the direction of flow of the air following the refrigerant-air heat exchanger 7 as well as at inlets into a first cold air flow path 10 and a second cold air flow path 11 an air guide mechanism 12 is disposed for conducting and dividing the air into the cold air flow paths 10, 11. The air mass flow conducted into the first flow channel (4) guided over the evaporator 7 can herein be divided in proportions of 0% to 100% onto the cold air flow paths 10, 11. By means of the air guide mechanism 12 a certain proportion of the air mass flow conditioned during its flow over the evaporator 7 can be discharged through the first cold air flow path 10 from the climate control system 1 or from the climate control unit 2 into the surrounding. The first cold air flow path 10 is also referred to as outgoing air channel.

The air introduced into the second cold air flow path 11 is conducted to a connecting element 13 of the flow channels 4, 5 which open out into the connecting element 13. The air mass flow conveyed through the second flow channel 5 is guided without change, which means without change of state, past the evaporator 7 into the connecting element 13. The second flow channel 5 is also termed a bypass with respect to the evaporator 7. The evaporator 7 implemented as an air-supplied heat exchanger assumes the entire flow cross section of the first flow channel 4.

The connecting element 13, coupling a first portion of the climate control unit 2 disposed in the front end of the motor vehicle with a second portion of the climate control unit 2 disposed in the interior of the motor vehicle, is implemented, for one, for accepting and mixing the air mass flows conducted through the flow channels 4, 5 and, on the other hand, for dividing and conducting air mass flows into different zones of the climate control unit 2. A first air mass flow can herein be guided through an opened, first air guide mechanism 14 into a first zone of the climate control unit 2, while a second air mass flow is guided through an opened, second air guide mechanism 15 into a second zone of the climate control unit 2. The air guide mechanisms 14, 15, which are also referred to as temperature louvers, are infinitely adjustable between two end positions "completely opened" and "completely closed".

The air mass flows, flowing at opened air guide mechanisms 14, 15 out of the connecting element 13 into the zones of the climate control unit 2, which are based on cooled and/or dehumidified flow, unconditioned flow or a mixture thereof, are conducted for possible heating to a heating heat exchanger 16. The heating heat exchanger 16 implemented as air-supplied heat exchanger is disposed within flow channels of the zones and in each case assumes the entire flow cross section of the flow channel.

After they have flowed across the heat transfer surface of the heating heat exchanger 16, the conditioned air mass flows are guided into the passenger compartment through air outlets 17, 18a, 18b, 19a, 19b. The air mass flow flowing out through the first air outlet 17 is, for example, guided to the front windshield, an air mass flow flowing out through one of the second air outlets 18a, 18b is guided through the dashboard directly to a passenger of the passenger compartment and an air mass flow flowing out through one of the third air outlets 19a, 19b is guided through an air outlet to the footwell. In addition, each air outlet 17, 18a, 18b, 19a, 19b can be implemented with an electrical resistance heater for the temporary reheating of the through-flowing air mass flow.

The air guide mechanisms 8, 12, 14, 15 are disposed at different positions between "completely opened" and "completely closed" as needed.

Figure 1B:
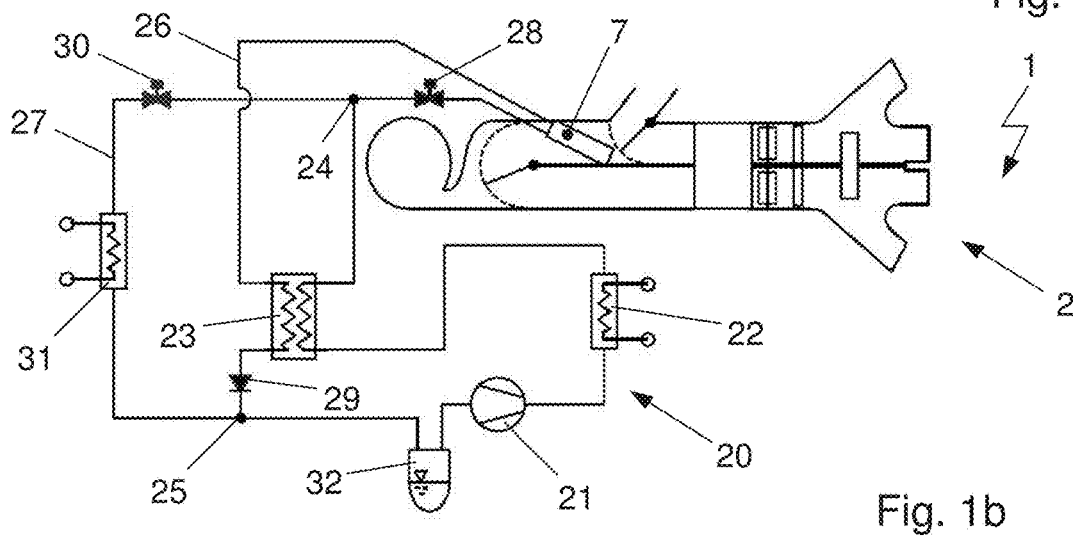
FIG. 1b: the climate control unit of the climate control system according to FIG. 1a with a refrigerant circulation.

In FIG. 1b can be seen the climate control unit 2 of the climate control system 1 according to FIG. 1a with a refrigerant circulation 20. The refrigerant circulation 20 comprises in the direction of flow of the refrigerant a compressor 21, a first refrigerant-coolant heat exchanger 22 operated as condenser/gas cooler as well as a branch point 24. Between the refrigerant-coolant heat exchanger 22 and the branch point 24 is disposed an internal heat exchanger 23, in particular the high-pressure side of the internal heat exchanger 23.

Between the branch point 24 and an opening site 25 extend a first refrigerant path 26 and a second refrigerant path 27. The first refrigerant path 26 is implemented with a first expansion element 28, in particular an expansion valve, operable as expansion means, with the refrigerant-air heat exchanger 7 disposed within housing 3 of the climate control unit 2, the internal heat exchanger 23, in particular the high-pressure side of the internal heat exchanger 23, as well as with a check valve 29. The second refrigerant path 27, disposed between the branch point 24 and the opening site 25 parallel to the first refrigerant path 26 is implemented with a second expansion element 30 in particular an expansion valve, operable as expansion means, as well as with a second refrigerant-coolant heat exchanger 31 operated as evaporator. The check valve 29, that can also be developed as a shut-off valve, prevents the return flow of refrigerant into the first refrigerant path 27 closed with the first expansion element 28, if the refrigerant is exclusively conducted through the second refrigerant path 27. The internal heat exchanger 23 serves in particular for enhancing the efficiency during operation of the refrigerant circulation 20 in chiller mode.

In the direction of flow of the refrigerant the refrigerant circulation 20 following the opening site 25 comprises an accumulator 32 disposed on the low-pressure side. The compressor 21 draws the gaseous refrigerant from the accumulator 32. The refrigerant circulation 20 is closed. According to an alternative embodiment, instead of the accumulator 32, in the direction of flow of the refrigerant after the refrigerant-coolant heat exchanger 22 operated as condenser/gas cooler, a collector is implemented at the high-pressure side, which can also be integrated within the refrigerant-coolant heat exchanger 22.

Figure 1C:
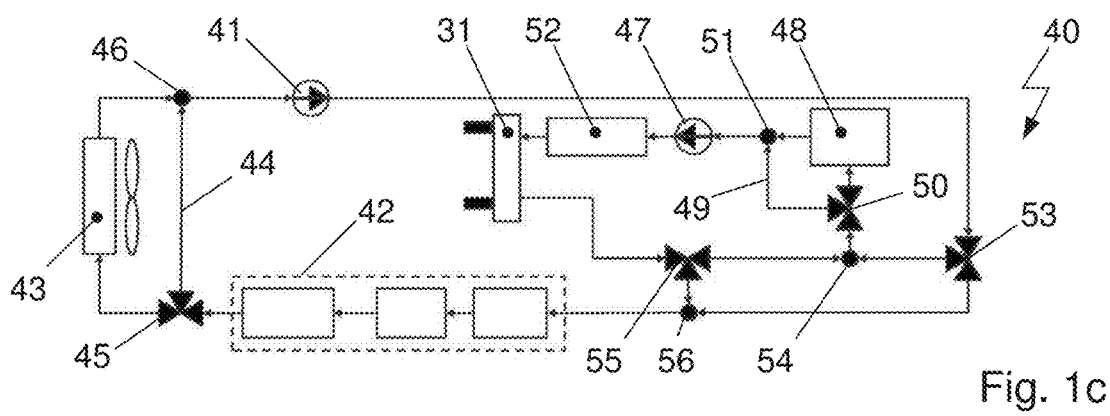
FIG. 1c: a first coolant circulation for tempering components of a power train and a battery as well as with a refrigerant-coolant heat exchanger as thermal connection to the refrigerant circulation.
Figure 1D:
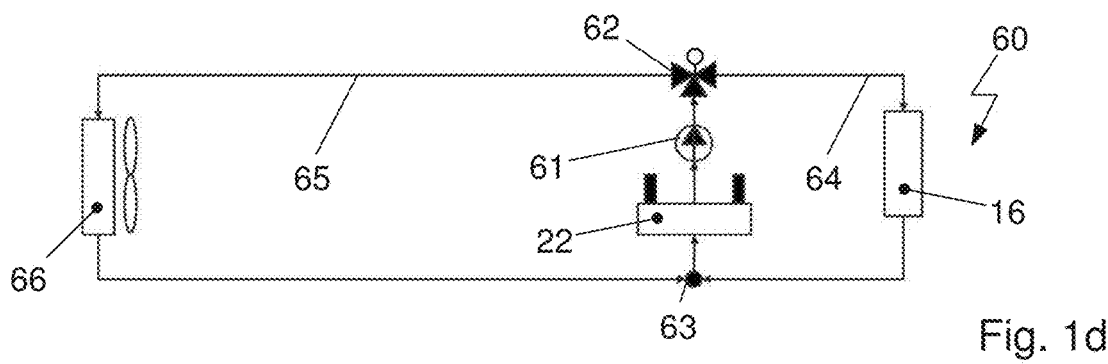
FIG. 1d: a second coolant circulation with a refrigerant-coolant heat exchanger as thermal connection to the refrigerant circulation and a heating heat exchanger for heating inflowing air for the passenger compartment.

FIG. 1c shows a first coolant circulation 40 for tempering components of a power train 42 and of a battery 48 as well as with the refrigerant-coolant heat exchanger 31 as a thermal connection to the refrigerant circulation 20, while FIG. 1d shows a second coolant circulation 60 with the refrigerant-coolant heat exchanger 22 as a thermal connection to the refrigerant circulation 20 and the heating heat exchanger 16 for heating the inflowing air for the passenger compartment.

Figure 2:
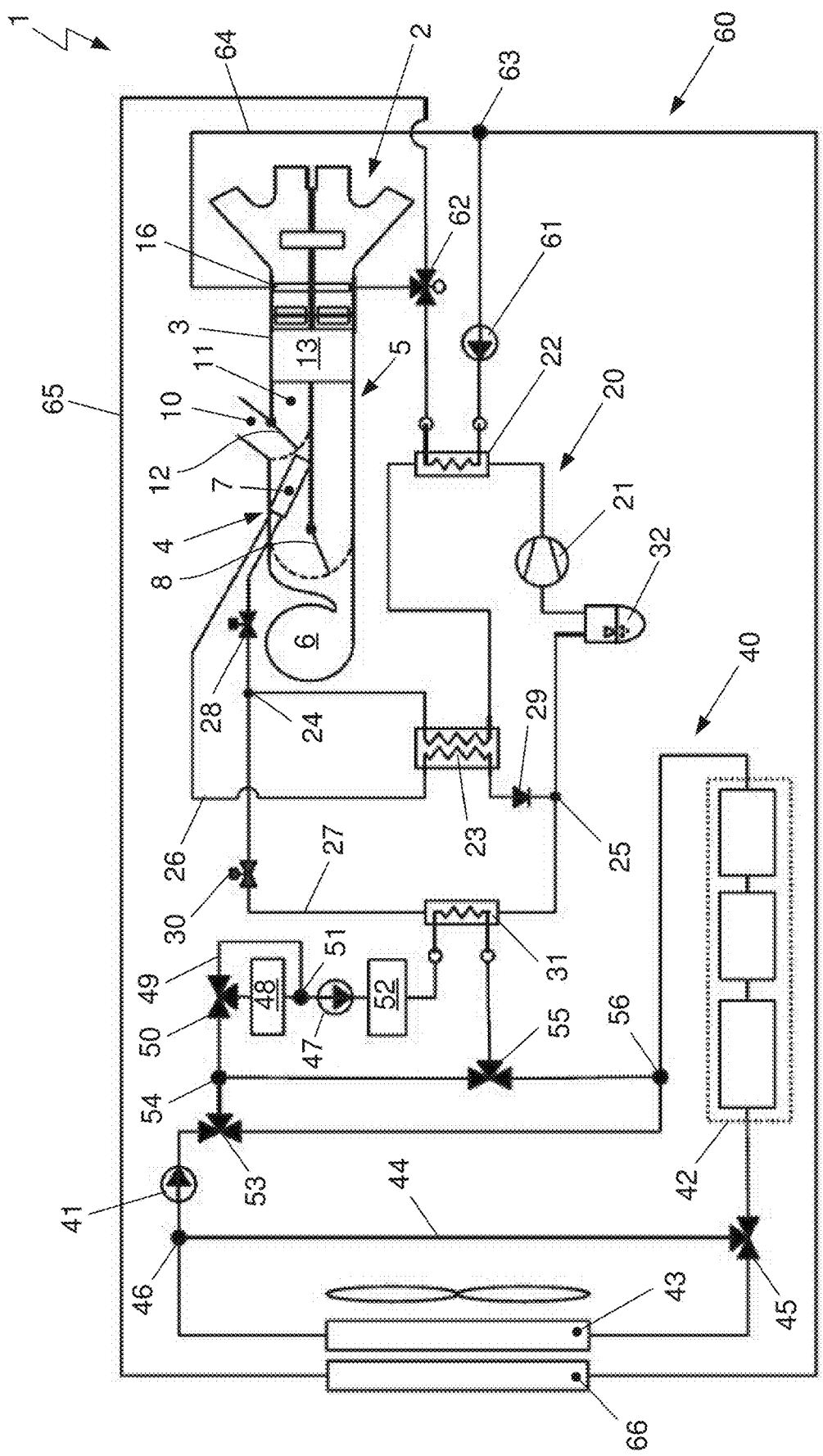
FIG. 2: the climate control system with the climate control unit and the refrigerant circulation according to FIGS. 1c and 1d as well as the coolant circulations according to FIGS. 1c and 1d, the climate control system according to FIG. 2

In FIG. 2 is evident the climate control system 1 with the climate control unit 2 and the refrigerant circulation 20 according to FIG. 1b as well as the coolant circulations 40, 60 according to FIGS. 1c and 1d.

The first coolant circulation 40, which is also referred to as low temperature coolant circulation, comprises a first conveyance means 41, in particular a pump, of a primary circuit for the conveyance of the coolant between the components of the power train 42 and a first coolant-air heat exchanger 43. The coolant-air heat exchanger 43 is supplied with ambient air.

In order to guide the coolant past the first coolant-air heat exchanger 43, and thus not supply coolant to the coolant-air heat exchanger 43, a bypass 44 is developed which extends from a branch point 45 to an opening site 46. The branch point 45 developed as a three-way valve, is disposed in the direction of flow of the coolant directly upstream of the first coolant-air heat exchanger 43, while the opening site 46 is disposed directly downstream of the first coolant-air heat exchanger 43 and thus between the coolant-air heat exchanger 43 and the conveyance means 41. Depending on the operating mode, the conveyance means 41 draws the coolant from the first coolant-air heat exchanger 43 or through the bypass 44 from heat exchangers of the components of the power train 42. By means of branch point 45 implemented as a three-way valve the mass flow of the coolant can be apportioned between 0% and 100%.

In the direction of flow of the coolant, between the conveyance means 41 and the heat exchangers of the components of the power train 42, a branch point 53 and an opening site 56 are disposed as a connection to a secondary circuit.

The secondary circuit also comprises a conveyance means 47, in particular a pump, for conveying the coolant between the refrigerant-coolant heat exchanger 31 and a battery heat exchanger 48. Within the secondary circuit an auxiliary heating element 52, for example an electric resistance heater, is additionally provided in order to heat the coolant as needed.

To conduct the coolant past the battery heat exchanger 48, and in this way not to supply the battery heat exchanger 48 with coolant, a bypass 49 is implemented which extends from a branch point 50 to an opening site 51. The branch point 50 developed as a three-way valve, is disposed in the direction of flow of the coolant directly upstream of the battery heat exchanger 48, while the opening site 51 is disposed directly downstream of the battery heat exchanger 48 and thus between the battery heat exchanger 48 and the conveyance means 47. Depending on the operating mode, the conveyance means 47 draws the coolant from the battery heat exchanger 48 or through the bypass 49. By means of the branch point 50 developed as a three-way valve, the mass flow of the coolant can in each instance be apportioned between 0% and 100%.

In the direction of flow of the coolant, between the refrigerant-coolant heat exchanger 31 and the branch point 50 of bypass 49 around the battery heat exchanger 48, a branch point 55 and an opening site 54 is provided as a connection to the primary circuit, in particular to the branch point 53 and to the opening site 56 of the primary circuit. The branch points 53, 55 are each advantageously implemented as three-way valves.

The second coolant circulation 60 according to FIG. 1d, which is also referred to as high temperature coolant circulation, comprises a conveyance means 61 in particular a pump, for conveying the coolant between the refrigerant-coolant heat exchanger 22 operated as condenser/gas cooler and the heating heat exchanger 16, on the one hand, as well as to a second coolant-air heat exchanger 66, on the other hand. The coolant-air heat exchanger 66 is supplied with ambient air.

The heating heat exchanger 16 is herein disposed in a first coolant path 64 and the coolant-air heat exchanger 66 in a second coolant path 65. The coolant paths 64, 65 extend from a branch point 62 to an opening site 63 and can be supplied in parallel with coolant.

The branch point 62 according to FIG. 1d is disposed in the direction of flow of the coolant downstream of the conveyance means 61, and thus between the conveyance means 61 and the heating heat exchanger 16 or the coolant-air heat exchanger 66, while the opening site 63 in the direction of flow of the coolant is disposed upstream of the refrigerant-coolant heat exchanger 22 and thus between the heating heat exchanger 16 or the coolant-air heat exchanger 66 and the refrigerant-coolant heat exchanger 22. According to FIG. 2 the branch point 62 can also be disposed in the direction of flow of the coolant downstream of the refrigerant-coolant heat exchanger 22 and thus between the refrigerant-coolant heat exchanger 22 and the heating heat exchanger 16 or the coolant-air heat exchanger 66, while the opening site 63 in the direction of flow of the coolant is disposed upstream of the conveyance means 61 and thus between the heating heat exchanger 16 or the coolant-air heat exchanger 66 and the conveyance means 61.

By means of the branch point 62, developed as a three-way valve, the mass flow of the coolant can be divided through the coolant paths 64, 65 in proportions between 0% and 100%. The conveyance means 61 draws the coolant from the refrigerant-coolant heat exchanger 22. The coolant circulation 60 is closed.

The coolant-air heat exchangers 43, 66 of the coolant circulations 40, 60 are disposed sequentially in the direction of flow of ambient air such that the ambient air flows toward the first coolant-air heat exchanger 43 and subsequently the second coolant-air heat exchanger 66 is supplied with ambient air.

Figure 3A:
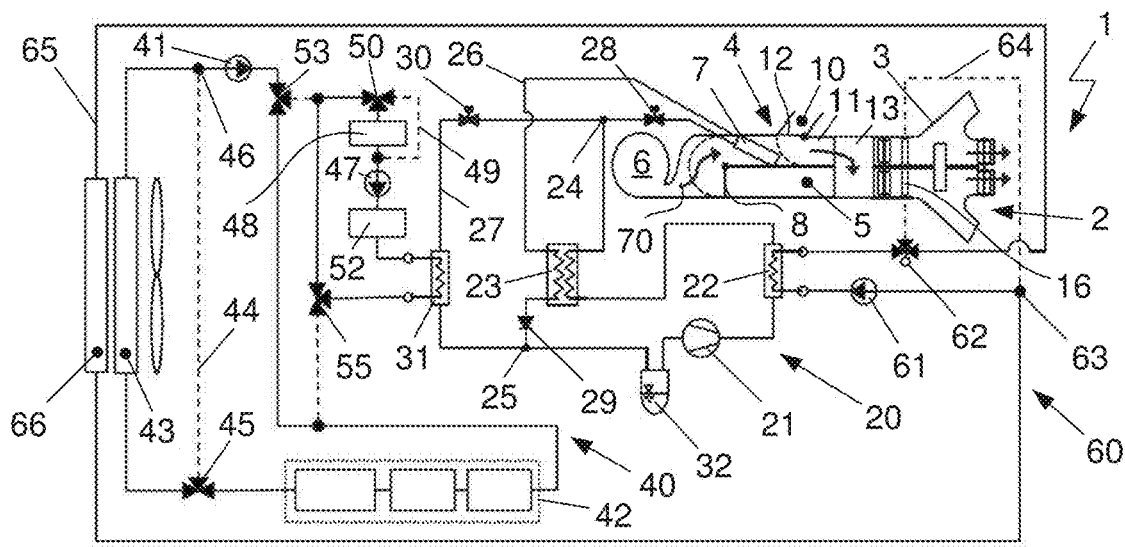
FIG. 3a: during operation in chiller mode as well as with active cooling of the battery and with cooling of components of the power train.

When operating the climate control system 1 in chiller mode, which means cooling of the air to be supplied to the passenger compartment, as well as with active cooling of battery 48 and with the cooling of the components of the power train 42 according to FIG. 3a, the refrigerant circulation 20, the first coolant circulation 40 and the second coolant circulation 60 are active. The primary circuit and the secondary circuit of the first coolant circulation 40 are operated separately from one another, both conveyance means 41, 47 of the first coolant circulation 40 are operational.

In the representation of different operating modes of the climate control system 1 lines supplied with refrigerant or coolant of the refrigeration circulation or of the coolant circulations 40, 60 are identified by solid lines, while the lines not supplied with refrigerant or coolant are identified by dashed lines.

The air guide mechanism 8 of the climate control unit 2 is oriented such that the air mass flow conveyed by blower 6 into the housing 3 in the direction of flow 70 is guided in its entirety into flow channel 4 and the second flow channel 5 is closed. The air when flowing across the heat transfer surface of the refrigerant-air heat exchanger 7, operated as evaporator, is cooled and/or dehumidified and is subsequently guided in its entirety into the connecting element 13 for further distribution. The air guide mechanism 12 is oriented such that it completely closes the first cold air flow path 10, while the second cold air flow path 11 is completely opened.

The heat absorbed in evaporator 7 of refrigerant circulation 20 by the refrigerant is in the first refrigerant-coolant heat exchanger 22, operated as condenser/gas cooler, transferred to the coolant circulating in the second coolant circulation 60. The refrigerant, drawn in and compressed by compressor 21, is conducted for the release of heat through the first refrigerant-coolant heat exchanger 22 and the high-pressure side of the internal heat exchanger 23. At the branch point 24 the refrigerant is divided onto the first refrigerant path 26 and the second refrigerant path 27. The first refrigerant mas subflow expanded during its flow through the first expansion element 28, is conducted for the absorption of heat from the inflowing air for the passenger compartment through the evaporator 7 and for superheating through the low-pressure side of the internal heat exchanger 23 to the opening site 25. The second refrigerant mass subflow expanded during its flow through the second expansion element 30, is conducted for the absorption of heat from the secondary circuit of the first coolant circulation 40 through the second refrigerant-coolant heat exchanger 31, operated as evaporator, to the opening site 25.

The heat transferred in the first refrigerant-coolant heat exchanger 22 to the coolant of the second coolant circulation 60 is discharged in the second coolant-air heat exchanger 66 to ambient air. The coolant is herein conducted through the second coolant path 65, the first coolant path 64 is closed in particular at the branch point 62. The heating heat exchanger 16 is not supplied with coolant.

In the secondary circuit of the first coolant circulation 40 the coolant is conducted by the conveyance means 47 through the auxiliary heating element 52, which is not active, for the discharge of heat to the refrigerant through the second refrigerant-coolant heat exchanger 31 operated as evaporator and, for the absorption of heat from the battery, through the battery heat exchanger 48. The heat absorbed in the battery heat exchanger 48 by the coolant is transferred in the refrigerant-coolant heat exchanger 31 to the refrigerant. The bypass 49 of battery 48 is closed in particular at the branch point 50. The branch points 53, 55 of the first coolant circulation 40 are set such that the primary circuit and the secondary circuit are operated separately from one another.

The refrigerant-coolant heat exchanger 31, operated as evaporator and utilizing the refrigerant as a heat sink for the discharge of heat from electronic or electrical components such as the battery 48 or components of the power train 42 of the motor vehicle, is also referred to as chiller.

In the primary circuit of the first coolant circulation 40 the coolant is conducted by the conveyance means 41 for the absorption of heat through heat exchangers of the components of the power drive 42 and, for the release of heat, through the first coolant-air heat exchanger 43. The heat transferred in the heat exchangers of the components of the drive train 42 to the coolant is discharged in the first coolant-air heat exchanger 43 to ambient air. Bypass 44 is closed in particular at the branch point 45.

Figure 3B:
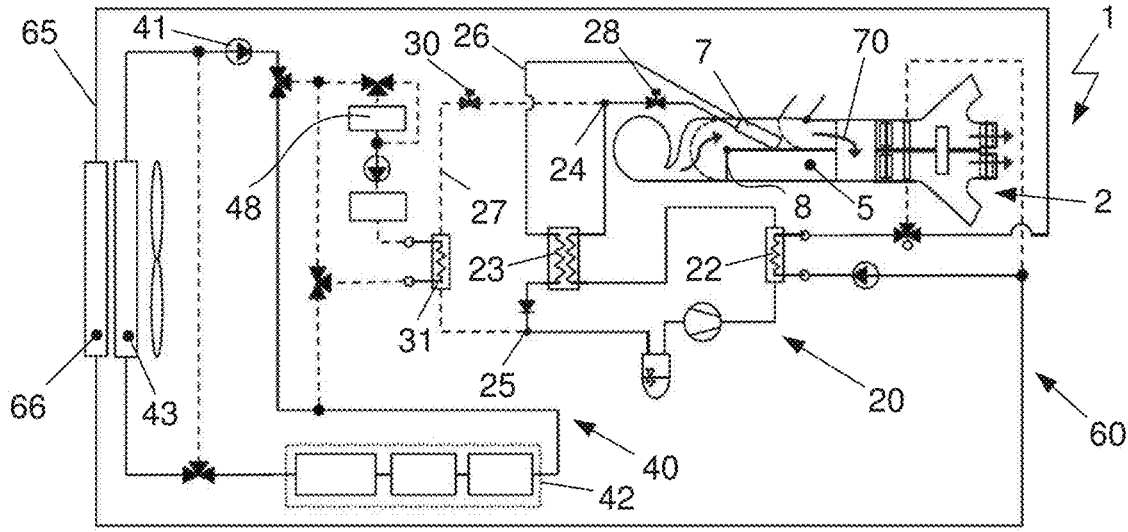
FIG. 3b: during operation in chiller mode as well as with cooling of the components of the power train.

During operation of the climate control system 1 in chiller mode, which means the cooling of the air to be supplied to the passenger compartment as well as with cooling of the components of the power train 42 according to FIG. 3b, the refrigerant circulation 20, the first coolant circulation 40 and the second coolant circulation 60 are active. There is no coolant flow through the secondary circuit of the first coolant circulation 40, only the conveyance means 41 of the primary circuit is operational. Thus, the difference from the operation of the climate control system 1 according to FIG. 3*a* lies in the active cooling of battery 48.

Since the secondary circuit of the first coolant circulation 40, and thus also the second refrigerant-coolant heat exchanger 31, disposed as thermal connection to the refrigerant circulation 20 in the second refrigerant path 27 of the refrigerant circulation 20, is not supplied with coolant, there is also no flow through the second refrigerant path 27 of the refrigerant circulation 20. The second expansion element 30 is closed.

For operation with cooling of the air to be supplied to the passenger compartment as well as with the cooling of the components of the power train 42, reference is made in this regard to the explanations in connection with FIG. 3*a*.

Figure 3C:
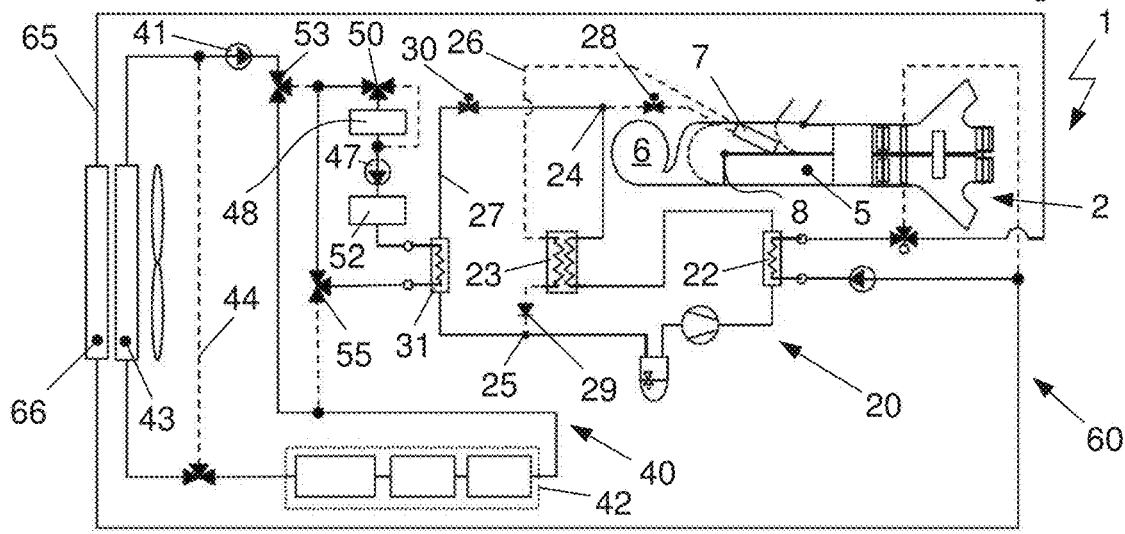
FIG. 3c: during operation with active cooling of the battery as well as cooling of the components of the of the power train.

During operation of the climate control system 1 with active cooling of the battery 48 as well as with cooling of the components of the power train 42 according to FIG. 3*c*, for example during the charging process of the battery 48 and without occupants in the passenger compartment, the refrigerant circulation 20, the first coolant circulation 40 and the second coolant circulation 60 are active. The primary circuit and the secondary circuit of the first coolant circulation 40 are operated separately from one another, both conveyance means 41, 47 of the first coolant circulation 40 are operational. No air is conveyed through the climate control unit 2 or the inflowing air for the passenger compartment is not conditioned. There is no flow of refrigerant through the evaporator 7 of the refrigerant circulation 20. Consequently, the difference from the operation of the climate control system 1 according to FIG. 3*a* lies in the operation of the refrigerant circulation 20 in chiller mode.

Since the refrigerant-air heat exchanger 7, operated as evaporator and disposed in the first refrigerant path 26, of refrigerant circulation 20 is not supplied with refrigerant, there is also no flow of refrigerant through the first refrigerant path 26 of the refrigerant circulation 20. The first expansion element 28 is closed. The check valve 29 prevents the return flow of refrigerant into the first refrigerant path 26 in particular into the internal heat exchanger 23. The internal heat exchanger 23 is not active.

For operation with active cooling of battery 48 as well as with cooling the components of the power train 42, reference is made in this regard to the explanations in connection with FIG. 3*a*.

Figure 4A:
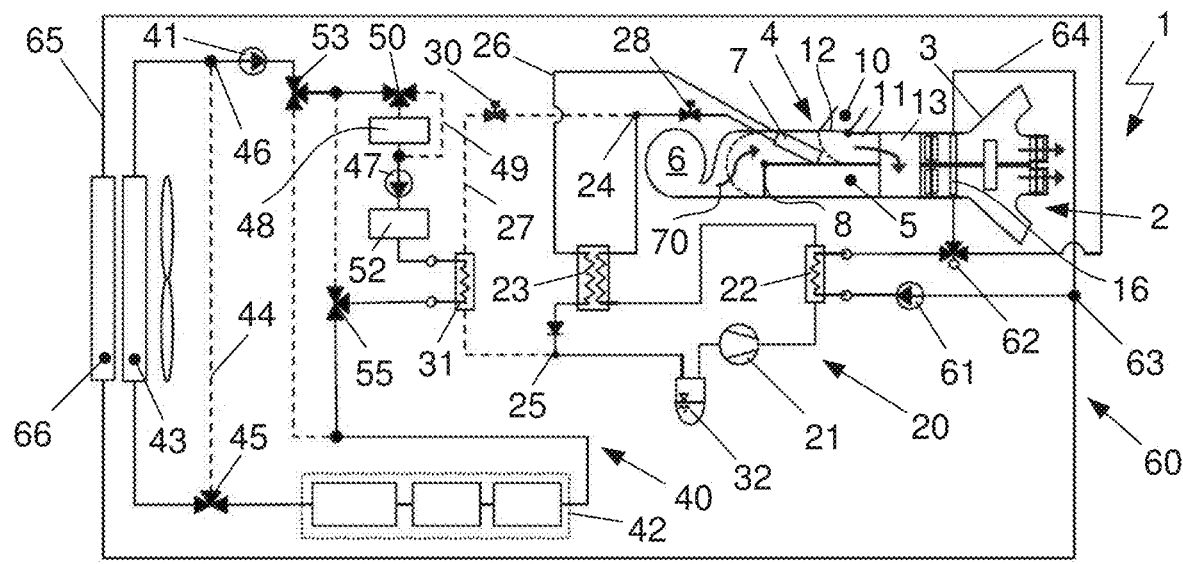
FIG. 4a: during operation in reheat mode as well as with passive cooling of the battery and of the components of the power train.

During operation of the climate control system 1 in reheat mode, for example for drying the inflowing air to the passenger compartment with subsequent reheating, as well as with passive cooling of battery 48 and cooling of the components of the power train 42 according to FIG. 4*a*, the refrigerant circulation 20, the first coolant circulation 40 and the second coolant circulation 60 are active. The primary circuit and the secondary circuit of the first coolant circulation 40 are operated as a common circuit, wherein the first conveyance means 41 and/or the second conveyance means 47 are in operation.

The air guide mechanism 8 of the climate control unit 2 is oriented such that the air mass flow conveyed by blower 6 into housing 3 in the direction of flow 70 is guided in its entirety into the first flow channel 4 and the second flow channel 5 is closed. The air, cooled and/or dehumidified during its flow across the heat transfer surface of the refrigerant-air heat exchanger 7 operated as evaporator, is introduced in its entirety into the connecting element for further distribution. The air guide mechanism 12 is oriented for complete closure of the first cold flow path 10, while the second cold air flow path 11 is completely opened.

The air mass flow flowing out of connecting element 13 is heated during its flow across the heat transfer surface of the heating heat exchanger 16. The air conducted across the heat transfer surface of the refrigerant-air heat exchanger 7, operated as evaporator, serves as the heat source for the coolant conducted through the heating heat exchanger 16 whereby heat is transferred from the coolant to the air to be supplied to the passenger compartment.

The heat absorbed in evaporator 7 of the refrigerant circulation 20 by the refrigerant is transferred in the first refrigerant-coolant heat exchanger 22 operated as condenser/gas cooler to the coolant circulating in the second refrigerant-coolant heat exchanger 22. The refrigerant, drawn-in and compressed by compressor 21, for the release of heat is conducted through the first refrigerant-coolant heat exchanger 22, the high-pressure side of the internal heat exchanger 23 and through the first refrigerant path 26. The first refrigerant mass subflow, expanded during its flow through the first expansion element 28, for the absorption of heat from the inflowing air for the passenger compartment is conducted through the evaporator 7 and for superheating is conducted through the low-pressure side of the internal heat exchanger 23 to the opening site 25. There is no flow of refrigerant through the second refrigerant path 27 of refrigerant circulation 20. The second expansion element 30 is closed.

The heat, transferred in the first refrigerant-coolant heat exchanger 22 to the coolant of the second coolant circulation 60, is released, depending on need, in the heating heat exchanger 16 to the inflowing air for the passenger compartment or to ambient air in the second coolant-air heat exchanger 66. Herein the coolant is divided at the branch point 62 onto the first coolant path 64 respectively the second refrigerant path 65. The heat not discharged in the heating heat exchanger 16 to the inflowing air for the passenger compartment is consequently transferred in the coolant-air heat exchanger 66 to ambient air.

In the first coolant circulation 40 the coolant is conducted by at least one of the conveyance means 41, 47 for the absorption of heat from the battery through the battery heat exchanger 48 as well as subsequently through the auxiliary heating element 52 and the refrigerant-coolant heat exchanger 31 which are not active. The bypass 49 of battery 48 is closed in particular at the branch point 50. The branch points 53, 55 of the first refrigerant circulation 40 are set such that the primary circuit and the secondary circuit are operated as a common circuit.

The coolant, heated during its flow through the battery heat exchanger 48, is conducted for the absorption of heat through heat exchangers of the components of the power train 42 and, for the release of heat, through the first coolant-air heat exchanger 43. The heat transferred in the battery heat exchanger 48 and in the heat exchangers of the components of the power train 42 to the coolant is released in the first coolant-air heat exchanger 43 to ambient air. The bypass 44 is closed in particular at the branch point 45.

Figure 4B:
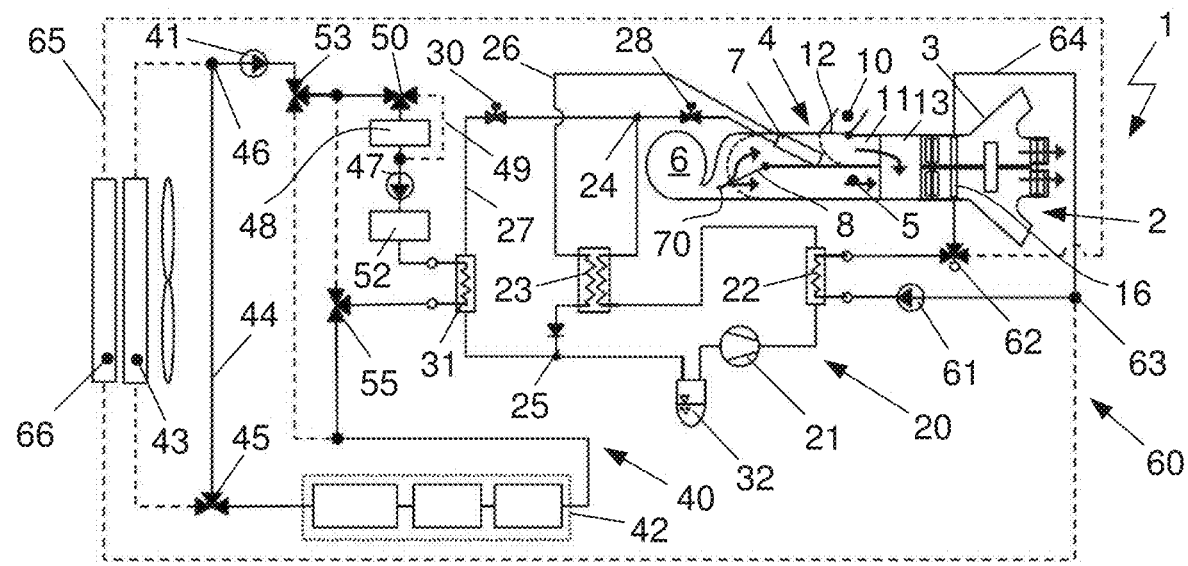
FIG. 4b: during operation in reheat mode as well as with active cooling of the battery and of the components of the power train as heat sources for the refrigerant.

During operation of the climate control system 1 in reheat mode as well as with active cooling of battery 48 and cooling of the components of the power train 42 according to FIG. 4*b*, the refrigerant circulation 20, the first coolant circulation 40 and the second coolant circulation 60 are active. The primary circuit and the secondary circuit of the first coolant circulation 40 are operated as a common circuit, similarly to the operating mode according to FIG. 4*a*, wherein the first conveyance means 41 and/or the second conveyance means 47 are operational.

The air guide mechanism 8 of climate control unit 2 is oriented such that the air mass flow conveyed by blower 6 into housing 3 in the direction of flow 70, divided into a first mass subflow and a second mass subflow, is guided into the first flow channel 4 and the second flow channel 5. The first air mass subflow, conveyed through the first flow channel 4 and cooled and/or dehumidified during its flow across the heat transfer surface of the refrigerant-air heat exchanger 7, operated as evaporator, is conducted in its entirety into the connection 13 for mixing and/or for further distribution. The air guide mechanism 12 is oriented for complete closure of the first cold air flow path 10, while the second cold air flow path 11 is completely opened. The second air mass subflow conveyed through the second flow path 5 is introduced into the connecting element 13 without having been conditioned.

The air mass flow leaving the connecting element 13 after the air mass subflows have been mixed, is heated during its flow across the heat transfer surface of the heating heat exchanger 16. The air conducted across the heat transfer surface of the refrigerant-air heat exchanger 7, operated as evaporator, serves as the first heat source for the coolant conducted through the heating heat exchanger 16, wherein the heat is transferred from the coolant to the air to be supplied to the passenger compartment.

The heat absorbed in evaporator 7 of the refrigerant circulation 20 by the refrigerant is transferred in the first refrigerant-coolant heat exchanger 22, operated as condenser/gas cooler, to the coolant circulating in the second coolant circulation 60. The refrigerant, taken in and compressed by compressor 21, is conducted for the release of heat through the first refrigerant-coolant heat exchanger 22 and the high-pressure side of the internal heat exchanger 23. At the branch point 24 the refrigerant is divided onto the first refrigerant path 26 and the second refrigerant path 27. The first refrigerant mass subflow, expanded during its flow through the first expansion element 28, is conducted for the absorption of heat from the first air mass subflow, conducted through the first flow channel 4, of the inflowing air for the passenger compartment, through the evaporator 7 and for superheating through the low pressure side of the internal heat exchanger 23 to the opening site 25. The second refrigerant mass subflow expanded during its flow through the second expansion element 30, is conducted for the absorption of heat from the first coolant circulation 40 through the second refrigerant-coolant heat exchanger 31, operated as evaporator, to the opening site 25. The coolant of the first coolant circulation 40 serves as the second heat source for the coolant conducted through the heating heat exchanger 16, wherein the heat is transferred from the coolant to the air to be supplied to the passenger compartment. Specifically at lower temperature of the ambient air, in this way waste heat from the components of the electrical power train 42 and of battery 48 can be additionally utilized in order to provide necessary heating power for the inflowing air for the passenger compartment.

The coolant of the second coolant circulation 60 is herein conducted through the first coolant path 64, the second path 65 is closed in particular at the branch point 62. The coolant-air heat exchanger 66 is not supplied with coolant.

In the first coolant circulation 40 the coolant is conducted by at least one of the conveyance means 41, 47 for the absorption of heat from the battery through the battery heat exchanger 48 as well as subsequently through the auxiliary heating element 52 which is not active. The bypass 49 of the battery 48 is closed in particular at the branch point 50. The coolant is subsequently, for the release of heat to the refrigerant, conducted through the second refrigerant-coolant heat exchanger 31, operated as evaporator, and for the absorption of heat through heat exchangers of the components of the power train 42. The branch points 53, 55 of the first coolant circulation 40 are set such that the primary circuit and the secondary circuit are operated as a common circuit.

The heat transferred in the battery heat exchanger 48 and in the heat exchangers of the components of the power train 42 to the coolant is released exclusively in the refrigerant-coolant heat exchanger 31 to the refrigerant, while the coolant-air heat exchanger 43 is not supplied with coolant. The bypass 44 around the coolant-air heat exchanger 43 is opened such that the entire coolant mass flow is conducted around the coolant-air heat exchanger 43.

When, in comparison to the operating mode according to FIG. 4b, the temperature of the outside air is lower or no waste heat is derived from the battery 48, ambient air or the already heated interior space air is utilized as additional heat source.

Figure 5A:
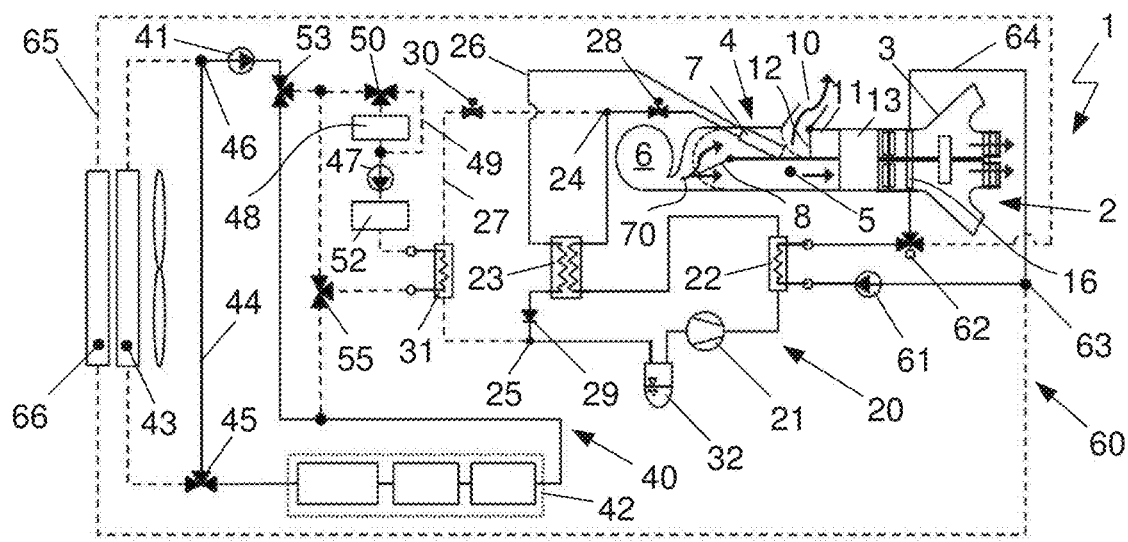
FIG. 5a: during operation in heat pump mode with air as the heat source as well as with cooling of the components of the power train.

During operation of the climate control system 1 in heat pump mode with air as the heat source as well as with cooling of the components of power train 42 according to FIG. 5a, the refrigerant circulation 20, the primary circuit of the first coolant circulation 40 and the second coolant circulation 60 are active.

The air guide mechanism 8 of the climate control unit 2 is oriented such that the air mass flow, conveyed by the blower 6 into the housing 3, after division into a first air mass subflow and a second air mass subflow, is conducted in the direction of flow 70 into the first flow channel 4 and the second flow channel 5.

The first air mass subflow, conveyed into the first flow channel 4 and cooled and/or dehumidified during its flow across the heat transfer surface of the refrigerant-air heat exchanger 7, operated as evaporator, is spent in its entirety into the surroundings though the first cold air flow path 10. The air guide mechanism 12 is oriented for complete closure of the second cold air flow path 11, while the first cold air flow path 10 is completely opened. The second air mass subflow is conducted through the second flow channel 5 into the connecting element 13 without having been conditioned.

Since blower 6 can convey fresh air from the surroundings, from circulating air from the passenger compartment or a mixture of fresh air and circulating air, into the flow channels 4, 5, ambient air or already heated air from the interior of passenger compartment can serve as a heat source.

The second air mass subflow leaving the connecting element 13 is heated during its flow across the heat transfer surface of the heating heat exchanger 16. The air, conducted across the heat transfer surface of the refrigerant-air heat exchanger 7 operated as evaporator, serves as a heat source for the coolant, conducted through the heating heat exchanger 16, wherein the heat is transferred from the coolant to the air to be supplied to the passenger compartment.

The refrigerant circulation 20 is operated according to the operating mode of the climate control system 1 according to FIG. 4c and reference is made in this regard to the associated explanations.

The coolant of the second coolant circulation 60 is conducted through the first coolant path 64, the second coolant path 65 is closed in particular at the branch point 62. The coolant-air heat exchanger 66 is not supplied with coolant.

In the primary circuit of the first coolant circulation 40 the coolant is conducted by the conveyance means 41 through heat exchangers of the components of the power train 42 for the absorption of heat. Herein, on the one hand, coolant is heated, while, on the other hand, the temperatures of the components of power train 42 are evened out. The coolant as well as also the components of power train 42 are utilized as heat storage. Bypass 44 around the coolant-air heat exchanger 43 is opened such that the entire coolant mass flow is guided around the coolant-air heat exchanger 43. The coolant-air heat exchanger 43 is not supplied with coolant.

Depending on the rise of temperature of the coolant or of the components of power train 42, the heat transferred in heat exchangers of the components of power train 42 to the coolant can at least be partially released to ambient air in the coolant-air heat exchanger 43. The coolant flows herein through the coolant-air heat exchanger 43, bypass 44 is closed in particular at branch point 45.

The branch point 53 of the first coolant circulation 40 is set such that no coolant flows through the secondary circuit.

Apart from the air conveyed through housing 3 as a first heat source, the waste heat of the components of power train 42 or of the battery 48 can additionally be utilized as heat sources.

Figure 5B:
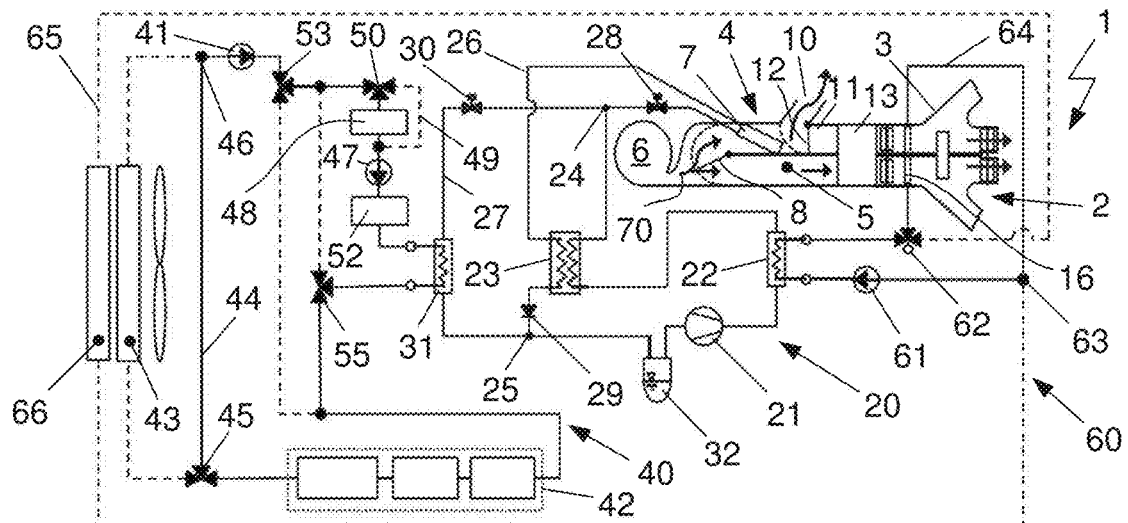
FIG. 5b: during operation in heat pump mode with air as the heat source as well as with active cooling of the battery and of the components of the power train as heat sources for the refrigerant.

During operation of the climate control system 1 in heat pump mode with air as the heat source as well as with active cooling of the battery 48 and cooling of the components of power train 42 as heat sources for the refrigerant according to FIG. 5b, the refrigerant circulation 20, the first coolant circulation 40 and the second coolant circulation 60 are active.

The climate control unit 2 is herein operated according to the operating mode of the climate control system 1 according to FIG. 4a and reference is made in this regard to the associated explanations.

The refrigerant circulation 20 is operated according to the operating mode of the climate control system 1 according to FIG. 5a and the first coolant circulation 40 as well as the second coolant circulation 60 are each operated according to the operating mode of the climate control system 1 according to FIG. 4b and reference is made in this regard to the associated explanations.

Figure 5C:
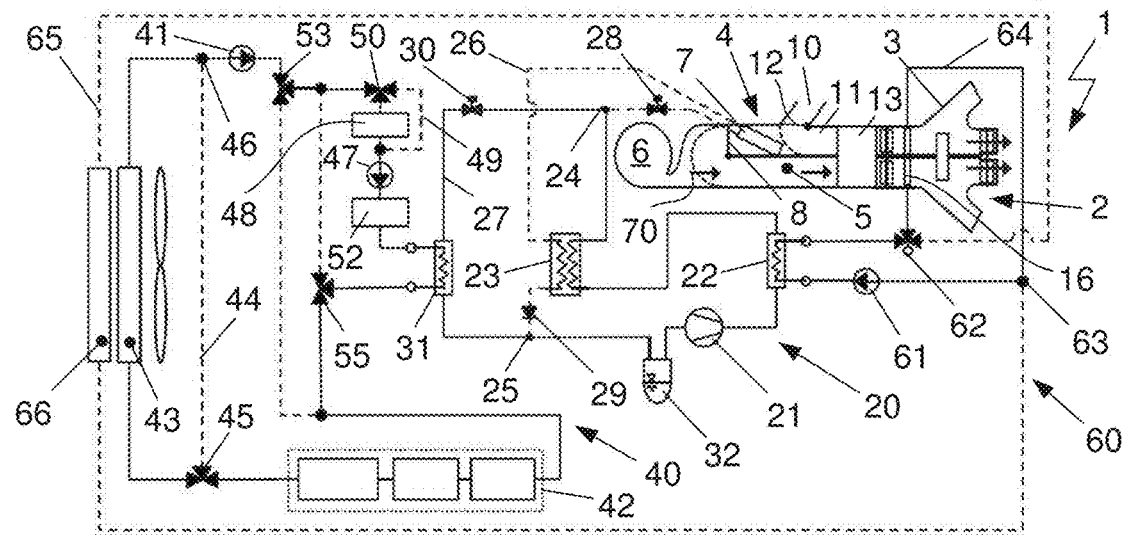
FIG. 5c: during operation in heat pump mode with active cooling of the battery and of the components of the power train as heat sources for the refrigerant.

During operation of the climate control system 1 in heat pump mode with active cooling of battery 48 as well as with cooling of the components of the power train 42, as heat sources for the refrigerant 4 according FIG. 5c are active the refrigerant circulation 20, the first coolant circulation 40 and the second coolant circulation 60.

The air guide mechanism 8 of the climate control unit 2 is oriented such that the air mass flow conveyed by blower 6 into housing 3 is guided in its entirety through the second flow channel 5 without being conditioned into the connecting element 13 and the first flow channel 4 is closed. The evaporator 7 disposed in the first flow channel 4 is not active and neither air nor refrigerant is supplied to it. The air mass flow leaving the connecting element 13 is heated during its flow across the heat transfer surface of the heating heat exchanger 16. The heat is transferred from the coolant to the air to be supplied to the passenger compartment.

The heat absorbed in evaporator 31 of the refrigerant circulation 20 by the refrigerant is transferred in the first refrigerant-coolant heat exchanger 22, operated as condenser/gas cooler, to the coolant circulating in the second coolant circulation 60. The refrigerant, taken in and compressed by compressor 21, is conducted for the output of heat through the first refrigerant-coolant heat exchanger 22, the high-pressure side of the non-active internal heat exchanger 23 and through the second refrigerant path 27. The refrigerant, expanded during its flow through the second expansion element 30, is conducted for the absorption of heat from the first coolant circulation 40 through evaporator 31 to the opening site 25. Since the refrigerant-air heat exchanger 7, operated as evaporator and disposed in the first refrigerant path 26 of refrigerant circulation 20, is not supplied with refrigerant, there is also no flow of refrigerant through the first refrigerant path 26 of the refrigerant circulation 20.

The first expansion element 26 is closed. Check valve 29 prevents the return flow of refrigerant into the refrigerant path 26 in particular into the internal heat exchanger 23.

The coolant of the second coolant circulation 60 is conducted through the first coolant path 64, the second coolant path 65 is closed in particular at the branch point 62. The coolant-air heat exchanger 66 is not supplied with coolant.

In the first coolant circulation 40 the coolant is conducted by at least one of the conveyance means 41, 47 for the absorption of heat from the battery through the battery heat exchanger 48 as well as subsequently through the auxiliary heating element 52 which is not active. Bypass 49 of battery 48 is closed in particular at the branch point 50. The coolant is subsequently conducted for the release of heat to the refrigerant through the second refrigerant-coolant heat exchanger 31, operated as evaporator, and, for the absorption of heat, through heat exchangers of the components of the power train 42. The branch points 53, 55 of the first coolant circulation 40 are set such that the primary circuit and the secondary circuit are operated as a common circuit.

Depending on the heat transferred in the battery heat exchanger 48 and in the heat exchangers of the components of power train 42 to the coolant or on the temperature of the coolant at the outlet of the heat exchangers of the components of the power train 42 as well as the temperature of the ambient air, the coolant is conducted for further absorption of heat from the ambient air through the first coolant-air heat exchanger 43. If the temperature of the ambient air is higher than the temperature of the coolant at the outlet of the heat exchangers of the components of the power train 42, the coolant can absorb heat from the surroundings. Bypass 44 is closed in particular at branch 45. The heat absorbed by the coolant is transferred in its entirety in the refrigerant-coolant heat exchanger 31 to the refrigerant of the refrigerant circulation 20.

If the temperature of the coolant at the outlet of the heat exchangers of the components of the power train 42 is higher than the temperature of the ambient air, heat can also be transferred from the coolant to the surroundings. The heat absorbed by the coolant is subsequently transferred in the refrigerant-coolant heat exchanger 31 to the refrigerant of the refrigerant circulation 20 as well as also in the coolant-air heat exchanger 43 to ambient air.

According to an alternative, not shown, operating mode, the coolant can be conducted at the branch point 45 in a mass subflow through the coolant-air heat exchanger 43 and in a mass subflow through the bypass 44 around the coolant-air heat exchanger 43 in order to set the proportion of the heat to be transferred to the refrigerant and to ambient air. The entire heat absorbed by the coolant could herein also be released in the refrigerant-coolant heat exchanger 31 to the refrigerant, while the coolant-air heat exchanger 43 is not supplied with coolant. Bypass 44 around the coolant-air heat exchanger 43 is opened such that the entire coolant mass flow is conducted around the coolant-air heat exchanger 43.

Figure 5D:
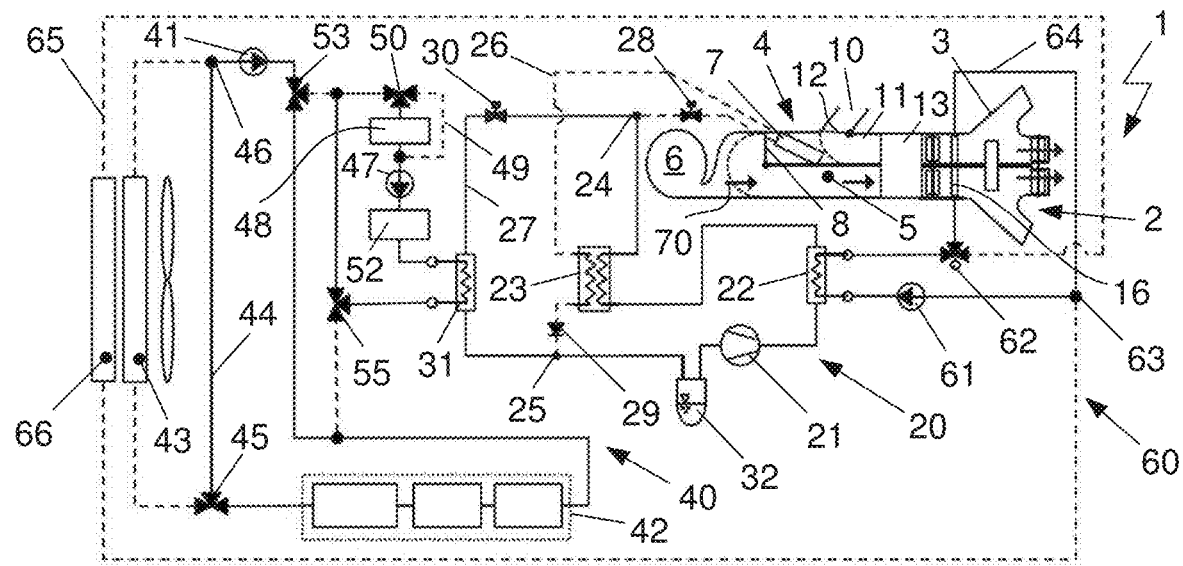
FIG. 5d: during operation in heat pump mode with an auxiliary heating element as heat source for heating the battery and as heat source for the refrigerant as well as with tempering of the components of the power train.

During operation of the climate control system 1 in heat pump mode with the auxiliary heating element 52 as the heat source for heating the battery 48 and as the heat source for the refrigerant as well as with tempering of the components of the power train 42 according to FIG. 5*d*, the refrigerant circulation 20, the first coolant circulation 40 and the second coolant circulation 60 are active.

The climate control unit 2, the refrigerant circulation 20 and the second coolant circulation 60 are each operated according to the operating mode of the climate control system 1 according to FIG. 5*c*, and reference is made in this regard to the associated explanations.

In the secondary circuit of the first coolant circulation 40 the coolant is conducted by the conveyance means 47 for the absorption of heat through the auxiliary heating element 52, which is operational, and for the release of heat to the refrigerant through the second refrigerant-coolant heat exchanger 31, operated as evaporator, and for the release of heat to the battery through the battery heat exchanger 48. The auxiliary heating element consequently serves as the heat source for the refrigerant and thus for the coolant circulating in the second coolant circulation 60 and for the inflowing air for the passenger compartment as well as for heating the battery 48. Bypass 49 of battery 48 is closed in particular at the branch point 50. The branch points 53, 55 of the first coolant circulation 40 are set such that the primary circuit and the secondary circuit are operated separately from one another.

In the primary circuit of the first coolant circulation 40 the coolant is conducted by the conveyance means 41 for the absorption of heat through the heat exchangers of the components of power train 42. Herein, on the one hand, the coolant is heated, while, on the other hand, the temperatures of the components of power train 42 are evened out. The coolant as well as also the components of power train 42 are utilized as heat stores. Bypass 44 around the coolant-air heat exchanger 43 is opened such that the entire coolant mass flow is conducted around the coolant-air heat exchanger 43. The coolant-air heat exchanger 43 is not supplied with coolant.

Figure 5E:
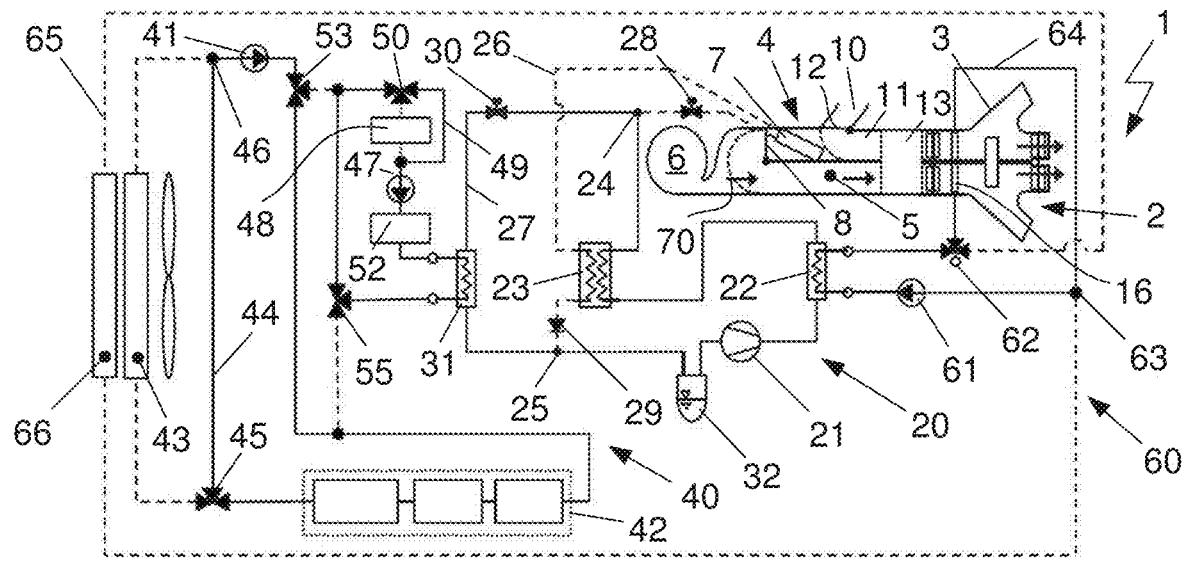
FIG. 5e: during operation in heat pump mode with the auxiliary heating element as heat source for the rapid heating of the inflowing air for the passenger compartment as well as with tempering of the components of the power train.

During operation of the climate control system 1 in heat pump mode with the auxiliary heating element 52 as the heat source, for rapid heating of the inflowing air for the passenger compartment as well as with tempering of the components of the power train 42 according to FIG. 5*e*, the refrigerant circulation 20, the first coolant circulation 40 and the second coolant circulation 60 are active.

The climate control unit 2, the refrigerant circulation 20, the second coolant circulation 60 and the primary circuit of the first coolant 40 are each operated according to the operating mode of the climate control system 1 according to FIG. 5*d* and therefore reference is made in this regard to the associated explanations.

In the secondary circuit of the first coolant circulation 40 the coolant is conducted by the conveyance means 47 for the absorption of heat through the auxiliary heating element 52, which is operational, and, for the release of heat to the refrigerant, through the second refrigerant-coolant heat exchanger 31 operated as evaporator. Consequently, the auxiliary heating element 52 serves as the heat source for the refrigerant and thus for the coolant circulating in the second coolant circulation 60 and for the inflowing air for the passenger compartment. The battery heat exchanger 48 is not supplied with coolant. Bypass 49 of battery 48 is opened such that the entire coolant mass flow is guided around the battery heat exchanger 48. The branch points 53, 55 of the first coolant circulation 40 are set such that the primary circuit and the secondary circuit are operated separately from one another.

In comparison to the operating mode according to FIG. 5*d*, with the operating mode according to FIG. 5*e* the heating dynamics in heat pump mode, that is heating of the inflowing air for the passenger compartment, is significantly increased. The temperature of the inflowing air can be increased in a very short time to the desired level of temperature. In the operating mode according to FIG. 5*d*, the heating energy, electrically generated with the auxiliary heating element 52, due to the large thermal mass of the battery 48, in particular of a high-voltage battery, is made available to the refrigerant in the refrigerant-coolant heat exchanger 31 offset in time or at a different temperature level.

The climate control system 1 in heat pump mode with pure heating operation of the inflowing air for the passenger compartment with non-conditioned air is operated according to one of FIGS. 5*a* to 5*e*.

If no dehumidification of the air to the supplied to the passenger compartment is required or desired, conducting air through the first flow channel 4 as well as across the evaporator 7 disposed therein, with the climate control system 1 according to the operating modes according to FIGS. 5*a* and 5*b*, heat can be absorbed from the air in particular from the ambient air. In addition, heat can be transferred in the coolant-air heat exchanger 43 from the ambient air to the coolant circulating in the first coolant circulation 40, if the coolant is cooled in the refrigerant-coolant heat exchanger 31 to a value below the temperature of the ambient air.

LIST OF REFERENCE NUMBERS

1 Climate control system
2 Climate control unit
3 Housing
4 First flow channel
5 Second flow channel
6 Blower
7 Refrigerant-air heat exchanger, evaporator
8 Air guide mechanism/louver second flow channel 5
9 Separating wall
10 First cold air flow path
11 Second cold air flow path
12 Air guide mechanism/louver cold air flow path 10, 11
13 Connecting element flow channels 4, 5
14 First air guide mechanism
15 Second air guide mechanism
16 Heating heat exchanger, coolant-air heat exchanger
17 First air outlet
18*a*, 18*b* Second air outlet
19*a*, 19*b* Third air outlet
20 Refrigerant circulation
21 Compressor
22 First refrigerant-coolant heat exchanger, condenser/gas cooler
23 Internal heat exchanger
24 Branch point
25 Opening site
26 First refrigerant path
27 Second refrigerant path
28 First expansion element
29 Check valve
30 Second expansion element
31 Second refrigerant-coolant heat exchanger, evaporator 32 Accumulator
40 First coolant circulation
41 First conveyance means
42 Components power train
43 First coolant-air heat exchanger
44 Bypass coolant-air heat exchanger 43
45 Branch point bypass 44
46 Opening site bypass 44
47 Second conveyance means, pump
48 Battery, battery heat exchanger
49 Bypass battery 48
50 Branch point bypass 49
51 Opening site bypass 49
52 Auxiliary heating element
53, 55 Branch point
54, 56 Opening site
60 Second coolant circulation
61 Third conveyance means, pump
62 Branch point
63 Opening site
64 First coolant path
65 Second coolant path
66 Second coolant-air heat exchanger
70 Flow direction air mass flow It is claimed:

1. A climate control system for conditioning the air of a motor vehicle passenger compartment, wherein the climate control system is developed for operation in chiller mode, in heat pump mode as well as in reheat mode, comprising
a climate control unit with a housing with a first flow channel and a second flow channel for the conduction of air,
a refrigerant circulation with a refrigerant-air heat exchanger, operable independently of the operating mode as evaporator, which is disposed within the housing of the climate control unit as well as with a first refrigerant-coolant heat exchanger, operable independently of the operating mode as condenser/gas cooler, and a second refrigerant-coolant heat exchanger, operable independently of the operating mode as evaporator, which are disposed outside of the housing of the climate control unit,
a first coolant circulation with the second refrigerant-coolant heat exchanger and heat exchangers for conditioning components of a power train and a battery heat exchanger as well as
a second coolant circulation with the first refrigerant-coolant heat exchanger as well as a heating heat exchanger disposed within the housing of the climate control unit
wherein the first coolant circulation comprises a primary circuit and a secondary circuit, wherein the primary circuit includes at least one conveyance means, a branch point and an opening site, wherein the secondary circuit includes at least one conveyance means, a branch point and an opening site,
wherein the branch point of the primary circuit and the opening site of the primary circuit are connected to each other through a connecting line,
wherein the branch point of the secondary circuit and the opening site of the secondary circuit are connected to each other through a connecting line,
wherein the branch point of the primary circuit and the opening site of the secondary circuit are connected to each other through a connecting line,
wherein the opening site of the primary circuit and the branch point of the secondary circuit are connected to each other through a connecting line,
wherein the secondary circuit of the first coolant circulation is implemented with an auxiliary heating element, the second refrigerant-coolant heat exchanger and the battery heat exchanger,
wherein the secondary circuit of the first coolant circulation comprises a bypass around the battery heat exchanger, which extends from a branch point to an opening site, and
wherein the branch point is disposed between the opening site of the connection with the primary circuit and the battery heat exchanger, and the opening site is disposed between the battery heat exchanger and the at least one conveyance means.

2. A climate control system according to claim 1, wherein at the first flow channel in the direction of flow of the air downstream of the refrigerant-air heat exchanger an air guide mechanism and a first cold air flow path are implemented such that an air mass flow, guided through the first flow channel and conditioned, can be divided into a first air mass subflow can be guided through the first cold air flow path into the surrounding of the housing and a second air mass subflow can be guided through a region, implemented as a second cold air flow path, of the first flow channel in the direction toward the passenger compartment.

3. A climate control system according to claim 1, wherein the second flow channel is developed as a bypass around the refrigerant-air heat exchanger disposed in the first flow channel, wherein the flow channels comprise at least one air guide mechanism for opening and closing the flow cross sections, such that an air mass flow conveyed by a blower is dividable into a first air mass subflow can be guided into the first flow channel and a second air mass subflow can be guided into the second flow channel.

4. A climate control system according to claim 1, wherein the first flow channel and the second flow channel are developed such that they open out into a connector for the through-conduction and/or mixing as well as for the distribution of air mass sub flows.

5. A climate control system according to claim 4, wherein the climate control unit is developed as a two-zone climate control unit, wherein each zone is developed with a flow channel that extends from the connector to air outlets and wherein the heating heat exchanger is disposed within the flow channels overlapping the flow channels.

6. A climate control system according to claim 1, wherein the refrigerant circulation comprises a compressor as well as a first refrigerant path and a second refrigerant path, each extending from a branch point to an opening site, wherein the refrigerant, depending on the operating mode of the climate control system, is dividable into refrigerant mass sub flows through the refrigerant paths, and wherein the branch point is disposed in the flow direction of the refrigerant downstream of the first refrigerant-coolant heat exchanger and the opening site is disposed upstream of the compressor.

7. A climate control system according to claim 6, wherein the first refrigerant path comprises a first expansion element and the refrigerant-air heat exchanger operable independently of the operating mode as evaporator.

8. A climate control system according to claim 6, wherein the second refrigerant path comprises a second expansion element and the second refrigerant-coolant heat exchanger operable independently of the operating mode as evaporator.

9. A climate control system according to claim 6, wherein the refrigerant circulation comprises an internal heat exchanger having a high-pressure side is disposed between the first refrigerant-coolant heat exchanger and the branch point as well and a low-pressure side within the first refrigerant path in the direction of flow of the refrigerant downstream of the refrigerant-air heat exchanger.

10. A climate control system according to claim 1, wherein the primary circuit of the first coolant circulation is implemented with heat exchangers for conditioning the components of the power train as well as with a first coolant-air heat exchanger for the heat transfer between the coolant and ambient air.

11. A climate control system according to claim 10, wherein the primary circuit of the first coolant circulation comprises a bypass around the first coolant-air heat exchanger which extends from a branch point to an opening site, wherein the branch point is disposed between the heat exchangers for conditioning components of the power train and the first coolant-air heat exchanger and the opening site is disposed between the first coolant-air heat exchanger and the at least one conveyance means.

12. A climate control system according to claim 1, wherein the second coolant circulation comprises a conveyance means as well as a first coolant path with the heating heat exchanger and a second coolant path with a second coolant-air heat exchanger for the heat transfer between the coolant and ambient air, wherein each coolant path extends from a branch point to an opening site and the coolant, depending on the operating mode of the climate control system, is dividable into coolant mass sub flows through the coolant paths.

13. A method for operating a climate control system for the combined operation in chiller and heat pump mode for cooling and heating as well as for reheat mode for conditioning the air of a motor vehicle passenger compartment as in claim 1, comprising the following steps:
compression of the refrigerant circulation in a refrigerant circulation to high pressure level,
transfer of heat from the refrigerant at high pressure level to a coolant circulating in the second coolant circulation while flowing through the first refrigerant-coolant heat exchanger as well as transfer of the heat from the coolant to ambient air while flowing through a coolant-air heat exchanger and/or to inflowing air for the passenger compartment while flowing through the heating heat exchanger,
expansion of the refrigerant to a low pressure level and conduction of the refrigerant through the refrigerant-air heat exchanger, operable as evaporator, for the absorption of heat from an air mass flow, which is conducted through the first flow channel of a climate control unit, and/or expansion of the refrigerant to low pressure level and conduction of the refrigerant through the second refrigerant-coolant heat exchanger, operable as evaporator, for the absorption of heat from the first coolant circulation.

14. A method according to claim 13, wherein during operation of the climate control system with active cooling of a battery and/or components of the power train, a coolant of the first coolant circulation is conveyed through the battery heat exchanger and/or through heat exchangers of the components of the power train, wherein the heat from the battery and/or heat from the components of the power train is transferred to the coolant, which is transferred in the second refrigerant-coolant heat exchanger to the refrigerant circulating in the refrigerant circulation and/or during the flow through a first coolant-air heat exchanger is transferred to ambient air.

15. A method according to claim 13, wherein during operation of the climate control system with active heating of a battery and/or with a coolant as the heat source for the refrigerant circulating in the refrigerant circulation a coolant of the first coolant circulation is conveyed through the auxiliary heating element, wherein heat is transferred to the coolant, which in the battery heat exchanger is transferred to the battery and/or in the second refrigerant-coolant heat exchanger is transferred to the refrigerant circulating in the refrigerant circulation.

* * * * *